United States Patent
Liu et al.

(10) Patent No.: US 10,810,037 B1
(45) Date of Patent: Oct. 20, 2020

(54) LIVE PAGE MIGRATION FOR HYBRID MEMORY VIRTUAL MACHINES

(71) Applicant: Huazhong University of Science and Technology, Hubei (CN)

(72) Inventors: Haikun Liu, Hubei (CN); Xiaofei Liao, Hubei (CN); Hai Jin, Hubei (CN); Dang Yang, Hubei (CN)

(73) Assignee: Huazhong University of Science and Technology, Wuhan (CN)

( * ) Notice: Subject to any disclaimer, the term of this patent is extended or adjusted under 35 U.S.C. 154(b) by 0 days.

(21) Appl. No.: 16/774,047

(22) Filed: Jan. 28, 2020

(30) Foreign Application Priority Data

Apr. 18, 2019 (CN) .......................... 2019 1 0315352

(51) Int. Cl.
*G06F 9/455* (2018.01)
*G06F 9/54* (2006.01)

(52) U.S. Cl.
CPC .......... *G06F 9/45558* (2013.01); *G06F 9/544* (2013.01); *G06F 2009/4557* (2013.01); *G06F 2009/45583* (2013.01)

(58) Field of Classification Search
CPC .................................................. G06F 9/45558
See application file for complete search history.

(56) References Cited

U.S. PATENT DOCUMENTS

| 2016/0253259 A1* | 9/2016 | Jin | ...................... G06F 12/1054 711/122 |
|---|---|---|---|
| 2017/0277640 A1* | 9/2017 | Jin | ...................... G06F 12/1054 |

\* cited by examiner

*Primary Examiner* — Sisley N Kim
(74) *Attorney, Agent, or Firm* — Michael X. Ye; Morris, Manning & Martin, LLP

(57) ABSTRACT

The present invention relates to a hybrid memory system with live page migration for virtual machine, and the system comprises a physical machine installed with a virtual machine and being configured to: build a channel for a shared memory between the virtual machine and a hypervisor; make the hypervisor generate to-be-migrated cold/hot page information and writing write the to-be-migrated cold/hot page information into the shared memory; make the virtual machine read the to-be-migrated cold/hot page information from the shared memory; and make the virtual machine according to the read to-be-migrated cold/hot page information perform a page migration process across heterogeneous memories of the virtual machine without stopping the virtual machine.

6 Claims, 1 Drawing Sheet

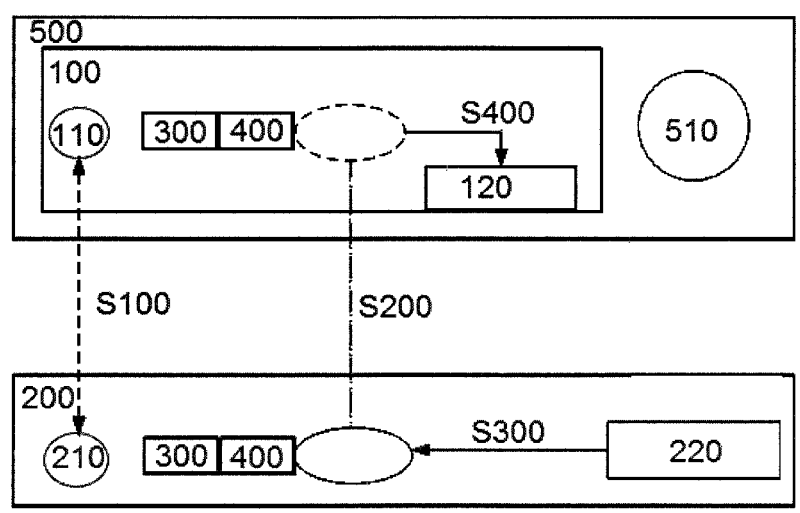

LIVE PAGE MIGRATION FOR HYBRID MEMORY VIRTUAL MACHINES

FIELD

The present invention relates to hybrid memory system for virtual machines, and more particularly to a hybrid memory system with live page migration for virtual machine.

DESCRIPTION OF RELATED ART

With the progress of hardware technology, various non-volatile storage media have been developed in the industrial circles. These storage media have many potential advantages such as low idle energy consumption, high read/write speed, good byte addressability, and high storage density, and are expected to be substitutes of DRAM in large memory systems. Storage class memory (SCM) is an abstract of these novel non-volatile memory devices. The emergence and applications of SCM break the boundary between memory and storage and allow CPUs to directly access data storage in SCM. In addition, due to the non-volatile nature of SCM, there is no need to store calculation results in external storage having the nature of persistent storage, and this effectively addresses data I/O bottleneck and improves timeliness of big data processing. Thus, the emergence of SCM objectively provides opportunities for design and development of novel memory compute modes.

However, as compared to DRAM, the existing SCM products have imbalance between read speed and write speed thereof, and some of them even have limited write cycles. By combining SCM with the traditional DRAM, the merits of the both can be leveraged, and this has become a research hotspot in the related industries. A hybrid memory structure based on the traditional DRAM and SCM nevertheless brings about new challenges to the designers of computer system software. Particularly, in the field of big data virtualization platforms, how to fuse heterogeneous memory media, how to achieve central management and effective use of heterogeneous memories, and how to effectively organize, reliably store and efficiently access data across heterogeneous are all problems to be addressed in virtual machines.

As reported in related studies, the basic concept of optimization of virtual machine memory in a hybrid memory environment is to have hot pages in non-volatile memory migrated to DRAM, and have cold pages in DRAM migrated to non-volatile memory, so as to achieve complementary combination between the two media and get optimal overall performance of the resulting hybrid memory structure. In the prior art, memory page migration is transparent to virtual machines and the whole page migration process is fully controlled by a hypervisor. For integrity and accuracy of data in a virtual machine during a migration process, the virtual machine has to be hung up during the migration process. Besides, false positive of page migration is exposed as a problem. As a result, the overall efficiency of memory page migration is low and the system overhead is high.

As a solution to the foregoing problems, the present invention provides a virtual machine-hypervisor memory page migration system, which has a channel of shared memory between a virtual machine and a hypervisor for exchange of page address information. In such a configuration, the hypervisor traverses page tables so as to acquiring cold/hot page information, and the virtual machine performs page migration. The cooperation and coordination of the two parts can realize a hybrid memory system with live page migration for virtual machine.

SUMMARY OF THE INVENTION

In view of the shortcomings of the prior art, the present invention provides a hybrid memory system with live page migration for virtual machine. The present invention performs page migration by means of reserved shared memory and coordination between its virtual machine and hypervisor. The hypervisor generates to-be-migrated cold/hot page information and sends the information to the virtual machine through the shared memory, so that the virtual machine performs a page migration process across heterogeneous memories of the virtual machine without stopping the virtual machine according to the to-be-migrated cold/hot page information, thereby improving page migration in terms of efficiency and effectiveness, while optimizing performance of the hybrid memory of the virtual machine.

According to one preferred embodiment, a hybrid memory system with live page migration for virtual machine, the system comprising a physical machine installed with a virtual machine and being configured to build a channel for a shared memory between the virtual machine and a hypervisor; make the hypervisor generate to-be-migrated cold/hot page information and writing the to-be-migrated cold/hot page information into the shared memory; make the virtual machine read the to-be-migrated cold/hot page information from the shared memory; and make the virtual machine according to the read to-be-migrated cold/hot page information perform a page migration process across heterogeneous memories of the virtual machine without stopping the virtual machine.

According to one preferred embodiment, wherein the heterogeneous memories comprise a dynamic random access memory (DRAM) and a non-volatile memory (NVM), in which the virtual machine according to the read to-be-migrated cold/hot page information performs the page migration process between the heterogeneous memories in a live manner, so as to have hot pages that have relatively high writing hotness migrating from the NVM to the DRAM, and to have cold pages that have relatively low writing hotness migrating from the DRAM to the NVM.

According to one preferred embodiment, wherein the step of making the hypervisor generate to-be-migrated cold/hot page information and writing the to-be-migrated cold/hot page information into the shared memory further comprises making the hypervisor periodically acquire write frequentness and a timestamp of a page table; making the hypervisor use multi-level hash linked lists to manage the general cold/hot page information and updating the general cold/hot page information according to the write frequentness and the timestamp of the page table; making the hypervisor extract from the general cold/hot page information the pages to be migrated so as to generate the to-be-migrated cold/hot page information; and making the hypervisor write the to-be-migrated cold/hot page information into the shared memory.

According to one preferred embodiment, wherein the step of making the hypervisor use the multi-level hash linked lists to manage the general cold/hot page information and updating the general cold/hot page information according to the write frequentness and the timestamp of the page table comprises: dividing the multi-level hash linked lists into at least three levels according to the write frequentness, in which a said linked list at a relatively low said level has relatively low write frequentness and scanning level.

According to one preferred embodiment, wherein the to-be-migrated cold/hot page information generated by the hypervisor through extracting the pages to be migrated from the general cold/hot page information is particularly generated by selecting from the linked list having the highest level virtual machine page frames to migrate from the NVM to the DRAM and selecting from the linked list having the lowest level the virtual machine page frames to migrate from the DRAM to the NVM.

According to one preferred embodiment, wherein the step of making the virtual machine according to the read to-be-migrated cold/hot page information perform the page migration process between the heterogeneous memories in the live manner comprises: sending a page migration commend through a user-level simulation platform to the hypervisor so as to order the hypervisor to write the to-be-migrated cold/hot page information into the reserved shared memory; making the virtual machine read the to-be-migrated cold/hot page information so as to acquire the virtual machine page frames to be migrated; and making the virtual machine use a kernel migration mechanism to perform NUMA node migration for the virtual machine page frames, so as to accomplish migration of cold/hot pages through shifting between physical media of the underlying heterogeneous memories.

According to one preferred embodiment, wherein when the virtual machine and/or the hypervisor access the shared memory, a mutex-based atomic operation is performed through a hypercall, so as to realize consistency and effectiveness of data in the shared memory.

According to one preferred embodiment, a live page migration method for a hybrid memory virtual machine, the system comprising a physical machine installed with a virtual machine, the method comprises: building a channel for a shared memory between the virtual machine and a hypervisor; making the hypervisor generate to-be-migrated cold/hot page information and writing the to-be-migrated cold/hot page information into the shared memory; making the virtual machine read the to-be-migrated cold/hot page information from the shared memory; and making the virtual machine according to the read to-be-migrated cold/hot page information perform a page migration process across heterogeneous memories of the virtual machine without stopping the virtual machine.

According to one preferred embodiment, wherein the heterogeneous memories comprise a dynamic random access memory (DRAM) and a non-volatile memory (NVM), in which the virtual machine according to the read to-be-migrated cold/hot page information performs the page migration process between the heterogeneous memories in a live manner, so as to have hot pages that have relatively high writing hotness migrating from the NVM to the DRAM, and to have cold pages that have relatively low writing hotness migrating from the DRAM to the NVM.

According to one preferred embodiment, wherein the step of making the hypervisor generate to-be-migrated cold/hot page information and writing the to-be-migrated cold/hot page information into the shared memory further comprises: making the hypervisor periodically acquire write frequentness and a timestamp of a page table; making the hypervisor use multi-level hash linked lists to manage the general cold/hot page information and updating the general cold/hot page information according to the write frequentness and the timestamp of the page table; making the hypervisor extract from the general cold/hot page information the pages to be migrated so as to generate the to-be-migrated cold/hot page information; and making the hypervisor write the to-be-migrated cold/hot page information into the shared memory.

According to one preferred embodiment, a computer system comprises a physical machine installed with a virtual machine and is configured: to read the to-be-migrated cold/hot page information from the shared memory; and make the virtual machine according to the read to-be-migrated cold/hot page information perform a page migration process across heterogeneous memories of the virtual machine without stopping the virtual machine.

According to one preferred embodiment, wherein the system is configured: to build a channel for a shared memory between the virtual machine and a hypervisor; make the hypervisor generate to-be-migrated cold/hot page information and writing the to-be-migrated cold/hot page information into the shared memory.

According to one preferred embodiment, wherein the heterogeneous memories comprise a dynamic random access memory (DRAM) and a non-volatile memory (NVM), in which the virtual machine according to the read to-be-migrated cold/hot page information performs the page migration process between the heterogeneous memories in a live manner, so as to have hot pages that have relatively high writing hotness migrating from the NVM to the DRAM, and to have cold pages that have relatively low writing hotness migrating from the DRAM to the NVM.

According to one preferred embodiment, wherein the system is configured: to build a channel for a shared memory between the virtual machine and a hypervisor to realize the information exchange between the virtual machine and a hypervisor.

According to one preferred embodiment, wherein the virtual machine according to the read to-be-migrated cold/hot page information perform the page migration process between the heterogeneous memories in the live manner comprises at least of the following steps of: sending a page migration commend through a user-level simulation platform to the hypervisor so as to order the hypervisor to write the to-be-migrated cold/hot page information into the reserved shared memory; making the virtual machine read the to-be-migrated cold/hot page information so as to acquire the virtual machine page frames to be migrated; and making the virtual machine use a kernel migration mechanism to perform NUMA node migration for the virtual machine page frames, so as to accomplish migration of cold/hot pages through shifting between physical media of the underlying heterogeneous memories.

The hybrid memory system with live page migration for virtual machine according to the present invention has at least the following advantages:

First, the virtual machine can have page migration performed without interrupt of operation. In the prior art, memory page migration is transparent to virtual machines and the whole page migration process is fully controlled by a hypervisor. For integrity and accuracy of data in a virtual machine during migration, the virtual machine has to be hung up during the migration process and resumes its operation after migration. Besides, false positives can appear for page migration. Performing page migration without hanging up the virtual machine can lead to bad data consistency between the physical machine and the virtual machine. This is because the virtual machine cannot "see" the hypervisor when the latter performs page migration, which means if a memory page accessed by the virtual machine has been migrated by the hypervisor, the virtual machine reads wrong data or non-expected data, leading to degraded data consistency and accuracy of the virtual machine. The scheme of the present invention eliminates interrupt costs otherwise required by the virtual machine. The hypervisor scans page tables to acquire cold/hot page information. The virtual machine performs migration and the coordination and cooperation of the both realize memory page migration across NUMA nodes, thereby improving page migration in terms of efficiency and effectiveness, and optimizing overall memory performance of the virtual machine.

Second, the present invention improves page migration in terms of effectiveness. With the memory region shared by the virtual machine and the hypervisor, information exchange can be achieved between the virtual machine and the hypervisor to optimize scanning of page tables and to prevent degradation of performance caused by false positives that otherwise occur in the traditional page migration operations. By comparison, the disclosed approach based on coordination between the virtual machine and the hypervisor enhances information exchange in implicit memory regions and supports page migration strategies with better performance. The term "false positive" originally refers to a case where a positive result is wrongly determined for a subject that does not have any positive symptoms for some reasons. In the context of page migration, the same term refers to a case where a hypervisor does not know about address information (e.g. anonymous memory, file mapping, cache, stacking, etc.) of progress run in a virtual machine as associated with the traditional page migration schemes. This can lead to invalid page migration in which a memory page determined as a hot page by the hypervisor is actually not frequently accessed after migration. In the disclosed scheme, page migration is performed within the virtual machine, and the virtual machine can refer to the information about the memory regions contained in the progress to further determine the degree of heat or cold of a page, thereby reducing invalid page migration.

Third, simulation of hybrid memory can be optimized. The virtual NUMA nodes of the virtual machine are bound to NUMA nodes of the physical machine physical, so as to provide the virtual machine with capacity flexibility of the two memory media. Meanwhile, the virtual machine supports special NUMA strategies that optimize utilization of the hybrid memory structure and provides a platform for development of hybrid memory in a virtual machine environment.

Fourth, the present invention manages cold/hot page information using multi-level hash linked lists, in which linked lists having the lower level has the lower write frequentness and scanning level, thereby reducing useless page scanning.

BRIEF DESCRIPTION OF THE DRAWINGS

FIG. 1 is a structural diagram of a system according to one preferred embodiment of the present invention.

DETAILED DESCRIPTION OF THE INVENTION

Embodiment 1

The present embodiment discloses a hybrid memory system with live page migration for virtual machine, or a memory page migration system, or a computation system. The system is designed to perform individual steps that form a method of the present invention, so as to achieve expected technical effects. For example, the computation system may perform page migration using the method of the present invention. Without causing conflicts or contradictions, the preferred embodiment of other embodiments may be entirely and/or partially used as complements for the present embodiment.

Preferably, a hybrid memory virtual machine may refer to: physical memory address space of a virtual machine, in which one part is the traditional RAM while the rest is NVM, so that the two form a parallel physical address space.

Preferably, to-be-migrated cold/hot page information may refer to: a guest frame number (GFN) of a virtual machine memory page that needs to be migrated.

According to one preferred embodiment, a hybrid memory system with live page migration for virtual machine, the system comprising a physical machine installed with a virtual machine 100 and being configured to build a channel for a shared memory between the virtual machine 100 and a hypervisor 200; make the hypervisor 200 generate to-be-migrated cold/hot page information and writing the to-be-migrated cold/hot page information into the shared memory. Preferably, a hypervisor 200 may be a KVM. KVM is an open-source system virtualization module. KVM is a module loadable to a LINUX kernel. KVM requires support for Intel VT or AMD V. The physical machine may be referred to as a host machine and the virtual machine be referred to as a guest machine.

According to one preferred embodiment, wherein the heterogeneous memories comprise a DRAM 300 and a NVM 400, in which the virtual machine according to the read to-be-migrated cold/hot page information performs the page migration process between the heterogeneous memories in a live manner, so as to have hot pages that have relatively high writing hotness migrating from the NVM 400. Preferably, the term DRAM refers to a dynamic random access memory. Preferably, NVM may refer to non-volatile memory.

According to one preferred embodiment, wherein making the hypervisor 200 generate to-be-migrated cold/hot page information and writing the to-be-migrated cold/hot page information into the shared memory further comprises at least of the following steps of: making the hypervisor 200 periodically acquire write frequentness and a timestamp of a page table; making the hypervisor 200 use multi-level, hash linked lists to manage the general cold/hot page information and updating the general cold/hot page information according to the write frequentness and the timestamp of the page table; making the hypervisor 200 extract from the general cold/hot page information the pages to be migrated so as to generate the to-be-migrated cold/hot page information; and making the hypervisor 200 write the to-be-migrated cold/hot page information into the shared memory.

According to one preferred embodiment, wherein the step of making the hypervisor 200 use the multi-level hash linked lists to manage the general cold/hot page information and updating the general cold/hot page information according to the write frequentness and the timestamp of the page table comprises: dividing the multi-level hash linked lists into at least three levels according to write frequentness, A linked list at the lower level has decreased write frequentness and scanning level. Preferably, the hypervisor 200 divides hash linked lists into three levels according to write frequentness, wherein the linked lists at the lower levels have the smaller write frequentness and the longer scanning cycles, which means less frequent scanning, and the linked lists at the higher levels have the greater write frequentness and the shorter scanning cycles, which means more frequent scanning. Pages at linked lists of the same level are queued in a write timestamp chronological order.

According to a preferred embodiment, wherein the to-be-migrated cold/hot page information generated by the hypervisor 200 through extracting the pages to be migrated from the general cold/hot page information is particularly generated by selecting from the linked list having the highest level virtual machine page frames to migrate from the NVM 400 to the DRAM 300 and selecting from the linked list having the lowest level the virtual machine page frames to migrate from the DRAM 300 to the NVM 400. Preferably, the linked lists at the higher levels have the greater write frequentness and hot pages are concentrated in the linked lists at the higher levels from which hot pages in the NVM are selected for migration. Preferably, the linked lists at the lower levels have the smaller write frequentness and cold pages are concentrated in the linked lists at the lower levels from which cold pages in the DRAM are selected for migration. Preferably, in the present invention, the system migrates hot pages in the NVM to the DRAM, and migrates cold pages in the DRAM to the NVM, so as to better use the limited storage resource in DRAM and NVM to improve system performance, thereby reducing write wear of the NVM and allowing central management and effective use of the heterogeneous memories.

According to one preferred embodiment, wherein making the virtual machine according to the read to-be-migrated cold/hot page information perform the page migration process between the heterogeneous memories in the live manner comprises at least of the following steps of: sending a page migration commend through a user-level simulation platform to the hypervisor 200 so as to order the hypervisor 200 to write the to-be-migrated cold/hot page information into the reserved shared memory; making the virtual machine read the to-be-migrated cold/hot page information so as to acquire the virtual machine page frames to be migrated; and making the virtual machine use a kernel migration mechanism to perform NUMA node migration for the virtual machine page frames, so as to accomplish migration of cold/hot pages through shifting between physical media of the underlying heterogeneous memories. Preferably, the method of the present invention performs a page migration process across heterogeneous memories of the virtual machine without stopping the virtual machine based on the following concept. Traditionally, page migration across heterogeneous memories on a virtual machine is done in two stages, namely page frequentness monitoring and page migration, both run in the hypervisor and thus being transparent to the virtual machine. For ensuring data consistency, the virtual machine has to be shut down during page migration. The present invention differently uses coordination between the hypervisor and the virtual machine to implement hybrid memory page migration. Particularly, the hypervisor monitors page frequentness, and then guest frame numbers of the memory pages to be migrated are transmitted to the virtual machine through a shared memory before the hybrid memory virtual machine runs the final page migration process. This ensures that page migration happens within the virtual machine, and eliminates the possibility of data inconsistency, thereby achieving accurate live page migration.

According to one preferred embodiment, wherein when the virtual machine and/or the hypervisor access the shared memory, a mutex-based atomic operation is performed through a hypercall, so as to realize consistency and effectiveness of data in the shared memory.

Embodiment 2

The present embodiment relates to further improvements to the Embodiment 1 of the present invention, and any feature that has been described is not repeated herein. This embodiment may be further improvements and/or supplements to Embodiment 1, and any feature that has been described is not repeated herein. Without conflict or contradiction, the entire and/or partial content of the preferred implementation manners of other embodiments may be used as a supplement to this embodiment.

According to one preferred embodiment, the system may comprise at least one physical machine. At least one of the physical machine(s) may be installed with a virtual machine. The system may be configured to: building a channel for a shared memory between the virtual machine and a hypervisor 200 for exchange of page information; making the hypervisor 200 traverse page tables so as to acquire cold/hot page information and writing the cold/hot page information into the shared memory; and/or making the virtual machine read the cold/hot page information from the shared memory and performing a page migration process across heterogeneous memories of the virtual machine without stopping the virtual machine according to the read cold/hot page information. Preferably, the cold/hot page information written into the shared memory by the hypervisor 200 may be the to-be-migrated cold/hot page information and/or the general cold/hot page information. Preferably, where the cold/hot page information written into the shared memory by the hypervisor 200 is the general cold/hot page information, the virtual machine can analyze the whole cold/hot information and get the to-be-migrated cold/hot page information.

According to one preferred embodiment, the hypervisor 200 traverses page tables so as to acquire the cold/hot page information through at least one of the following steps: periodically wakening a page table scanning progress 220 so as to traverse page tables through the wakened page table scanning progress 220; processing EPT table entries; according to A/D marker bit, adding one to the count of table entries of Dirty marker position bits, and updating the timestamp; and using multi-level hash linked lists to manage the cold/hot page information and according to the count of the table entries of the Dirty marker bit and the timestamp information updating the cold/hot page information, so as to select the physical page frames of the virtual machine to be migrated according to the cold/hot page information. Preferably, the Dirty marker bit is sized as one bit, which has a value of 0 or 1. When the CPU modifies a memory page, the Dirty bit of the EPT table entry corresponding to that page is set, which means that the marker bit has a value of 1. Through periodical scanning of the EPT page table, write frequentness of the corresponding page can be calculated according to the number of times that the Dirty marker bit is set for each EPT table entry. With such an EPT page table scanning approach, write frequentness of all the memory pages can be collected. The multi-level hash linked lists manage the frequentness information of memory pages so that the frequentness information is periodically updated and sieve out hot pages in the NVM and cold pages in the DRAM for page migration.

According to one preferred embodiment, the step where the virtual machine reads the cold/hot page information from the shared memory and performs the page migration process across the heterogeneous memories without stopping the virtual machine according to the read cold/hot page information may comprise: sending a migration commend to the hypervisor 200 through a user-level simulation platform at the virtual machine and ordering the hypervisor 200 to write the cold/hot page information into the shared memory, wherein the virtual machine reads the cold/hot page info nation and performs page migration therein using a page migration kernel driving module 120. Preferably, the user-level simulation platform may be a QEMU platform 500. The present invention in this way can at least achieve the following beneficial technical effects: first, the desired hybrid memory page migration is done inside the virtual machine so it is unnecessary to shut down the virtual machine for said migration; second, since the page migration happens inside the virtual machine as a process-level memory migration operation, there is no need to hang up the virtual machine, so the resulting performance overhead is small.

According to one preferred embodiment, the step of using the multi-level hash linked lists to manage the cold/hot page information and updating the cold/hot page information according to the count of table entries of the Dirty marker position bit and the timestamp information may comprise at least one of the following steps: according to access frequentness and timestamp information of EPT table entries, using multi-level hash linked lists to manage the cold/hot page information so as to speed up looking up; and according to the access frequentness dividing the linked lists into a first level, a second level and a third level, wherein the third level, the second level and the first level have their respective access frequentness and scanning level descended ordinally. Preferably, the foregoing access frequentness may refer to write frequentness. The present invention in this way can at least achieve the following beneficial technical effects: first, the hash linked list can fast locate data entries with O(1), thereby saving looking-up time; second, with hash linked lists of different levels having different scanning intervals, the time overhead for scanning the whole EPT page table can be reduced, thereby accelerating collection of page frequentness information.

According to one preferred embodiment, the hypervisor 200 may periodically select the GFNs from the linked lists of the highest level that are to migrate from the NVM 400 to the DRAM 300 and select the GFNs from the linked lists of the lowest level that are to migrate from the DRAM 300 to the NVM 400, so as to determine the number of pages to be migration in the two memory media and generate the to-be-migrated cold/hot page information. In an example where the linked lists are divided into three levels, the hypervisor 200 may periodically selects GFNs from the linked lists of the third level that are to migrate from the NVM 400 to the DRAM 300, and selects GFNs from the linked lists of the first level that are to migrate from the DRAM 300 to the NVM 400. Preferably, a GFN may refer to a page frame of the virtual machine. The present invention in this way can at least achieve the following beneficial technical effects: the multi-level hash linked lists are such used that based on page frequentness, the memory pages in the linked lists of the higher levels have greater write frequentness and are regarded as hot pages while the memory pages in the linked lists of the lower levels have smaller write frequentness and are regarded as cold pages. Due to locality of reference related to these memories, the foregoing sieving approach helps to improve accuracy for identifying cold/hot pages and reduce the overhead for global search.

According to one preferred embodiment, the steps of making the virtual machine read cold/hot page information from the shared memory and perform page migration across the heterogeneous memories according to the read cold/hot page information in the live manner may comprise at least one of the following steps: binding virtual NUMA nodes 110 to physical NUMA nodes 210 of a physical machine during initialization of the virtual machine, so as to realize simulation of the hybrid memory structure of the virtual machine and transmitting the physical page frames to be migrated through the reserved Guest-Host shared memory address space; making a QEMU monitor 510 using I/O commends of the hypervisor 200 to activate, suspend and stop the page migration progress performed by the hypervisor 200, so as to order the hypervisor 200 to write the to-be-migrated page information into the reserved shared memory and then transmit the information to the virtual machine; and making the virtual machine read the page table information in the shared memory so as to acquire physical pages of the virtual machine frame to be migrated, and using the page migration mechanism of the kernel to perform migration of physical pages of the virtual machine across the NUMA nodes, thereby shifting between heterogeneous physical memory media. The present invention in this way can at least achieve the following beneficial technical effects: first, the virtual machine has not to be stopped during page migration, so can save the performance overhead traditionally caused by hanging up the virtual machine; second, with the memory address space information of the progress, the virtual machine when performing page migration can further analyze the cold/hat degree of pages to migrate, thereby reducing invalid page migration.

According to another preferred embodiment, the step of making the virtual machine read the cold/hot page information form the shared memory and perform page migration across heterogeneous memories according to the read cold/hot page information in the live manner may comprise at least one of the following steps: making the QEMU monitor 510 send a commend for page migration to the hypervisor 200 so as to activate the page migration process; making the QEMU monitor 510 order the hypervisor 200 to write the cold/hot page information to be migrated into the reserved shared memory; making the virtual machine read the cold/hot page information so as to acquire the to-be-migrated physical page frames of the virtual machine, and using the kernel migration mechanism to perform migration on the NUMA nodes of the physical pages of the virtual machine, thereby achieving physical medium shift of the underlying hybrid memory and accomplishing migration of cold/hot pages; and determining whether the page migration flow has ended, and making the QEMU monitor 510 send a modulation command to the hypervisor 200, if yes, exiting the page migration process and hanging up the EPT page table scanning progress 220; if not, proceeding with the page migration process. Preferably, the EPT page table scanning progress 220 may refer to a page table scanning progress 220. The present invention in this way can at least achieve the following beneficial technical effects: first, the page migration approach is exposed to a user through the QEMU monitor 510, so the user can implement page migration of a hybrid memory virtual machine using the disclosed approach with improved performance; second, the approach is applicable to extensively used KVM/QEMU platforms, having great adaptability.

According to one preferred embodiment, access to the shared memory by the virtual machine and the hypervisor 200 may be achieved by means of a mutex-based atomic operation activated through a hypercall, so as to realize consistency and effectiveness of data in the shared memory.

According to one preferred embodiment, the method may comprise at least one of the following steps: binding the virtual MUMA nodes 110 of the virtual machine to a physical NUMA nodes 210 of the physical machine; building a channel of a shared memory between the virtual machine 100 and the hypervisor 200; writing to-be-migrated cold/hot page information that contains virtual machine guest frame numbers to migrate into the shared memory; making the virtual machine read the to-be-migrated cold/hot page information from the shared memory; and/or making the QEMU monitor 510 activate and/or stop the page migration process. The present invention in this way can at least achieve the following beneficial technical effects: first, the virtual NUMA nodes of the virtual machine are bound to the NUMA nodes of the physical machine, thereby supporting the traditional virtual machine with a hybrid memory structure, so that the virtual machine activated in this way is actually a hybrid memory virtual machine; second, with the hybrid memory structure, the virtual machine can have page migration across NUMA node done within the virtual machine, thereby accomplishing bottom medium shift of the memory pages without shutting down the virtual machine for page migration.

According to one preferred embodiment, the method may comprise at least one, of the following steps:

S100: binding the virtual MUMA nodes 110 of the virtual machine to the physical NUMA nodes 210 of the physical machine; S200: building a channel of a shared memory between the virtual machine 100 and the hypervisor 200; S300: writing the to-be-migrated cold/hot page information that contains the to-be-migrated guest frame numbers of the virtual machine into the shared memory; and/or S400: making the virtual machine read the to-be-migrated cold/hot page information from the shared memory.

Embodiment 3

The present embodiment relates to further improvements to the Embodiment 1 and the Embodiment 2 of the present invention, and any feature that has been described is not repeated herein.

The present invention discloses a live page migration method for a hybrid memory system for virtual machine, in other words, a page migration method for memory, or a calculation method. The method can be achieved by the system in the present invention and/or other substituted parts. For example, all parts in the system of the present invention achieves the method of the present invention. Without causing conflicts or conflicts, the entire content and/or partial content of other preferred embodiments may be supplemented as this embodiment.

According to one preferred embodiment, the method comprises at least one of the following steps of: building a channel for a shared memory between the virtual machine and a hypervisor 200; making the hypervisor 200 generate to-be-migrated cold/hot page information and writing the to-be-migrated cold/hot page information into the shared memory; making the virtual machine read the to-be-migrated cold/hot page information from the shared memory; and making the virtual machine according to the read to-be-migrated cold/hot page information perform a page migration process across heterogeneous memories of the virtual machine without stopping the virtual machine.

According to one preferred embodiment, wherein the heterogeneous memories comprise a DRAM 300 and a NVM 400, in which the virtual machine according to the read to-be-migrated cold/hot page information performs the page migration process between the heterogeneous memories in a live manner, so as to have hot pages that have relatively high writing hotness migrating from the NVM 400 to the DRAM 300, and to have cold pages that have relatively low writing hotness migrating from the DRAM 300 to the NVM 400.

Embodiment 4

The present embodiment relates to further improvements to the Embodiment 1, 2, 3 of the present invention, and any feature that has been described is not repeated herein. Without causing conflicts or conflicts, the entire content and/or partial content of other preferred embodiments may be supplemented as this embodiment.

According to one preferred embodiment, the method may comprise at least one of the following steps: S1: making the hypervisor 200 physically access statistics of hotness; and S2: making the virtual machine-hypervisor 200 coordinate page migration.

According to one preferred embodiment, the hypervisor 200 is configured for physically accessing statistics of hotness, wakening the EPT page table scanning progress 220 in a certain interval, traversing page tables, processing EPT table entries according to the A/D marker bit, adding one to the count of table entries of Dirty marker position bits, updating the timestamp, consolidating counting and timestamp information, using the multi-level hash linked lists to maintain page hotness information, and selecting the virtual machine physical page frames to migrate. The virtual machine-hypervisor 200 are configured for coordinating page migration, sending a migration commend to the KVM through the QEMU monitor 510, ordering the hypervisor 200 to write the cold/hot page information into the shared memory, making the virtual machine read the cold/hot page information, and performing page migration within the virtual machine by means of a specialized kernel driving module. Preferably, in the present invention, the KVM may refer to the hypervisor 200. In other words, the term "KVM" and the term "hypervisor 200" are exchangeable. Preferably, the specialized kernel driving module may refer to a page migration kernel driving module 120. Preferably, the Dirty marker bit is a bit on an EPT table entry, valued 0 or 1. Setting is an operation making the marker position be 1. An EPT entry with the Dirty marker bit set indicates that the corresponding memory page has been written, so as to make statistics of access frequentness.

According to one preferred embodiment, the step S1 may comprise at least one of the following sub-steps: making the KVM periodically waken the EPT page table scanning progress 220, traversing page tables, and recording access frequentness and timestamp of the page tables according to the A/D marker bit; and/or using multi-level hash linked lists to manage the cold/hot page information according to access frequentness and timestamp information of EPT table entries, using hash to speed up looking up, and dividing the linked lists into three levels according to access frequentness, including Hot, Active and Cold. The three levels have their respective access frequentness and scanning level descended ordinally, thereby reducing useless page scanning. After a certain interval, GFNs to migrate from the NVM 400 to the DRAM 300 are selected from the Hot linked lists, and GFNs to migrate from the DRAM 300 to the NVM 400 are selected from the Cold linked lists, so as to determine the number of pages to be migrated between the two memory media.

According to one preferred embodiment, the step S2 may comprise at least one of the following sub-steps: binding the virtual NUMA nodes to physical NUMA nodes during initialization of the virtual machine so as to realize simulation of virtual machine hybrid memory, and transmitting the physical page frames to be migrated through the reserved Guest-Host shared memory address space; making the QEMU monitor 510 activate, suspend and stop the page migration progress of the KVM through KVM I/O commands, thereby ordering the KVM to write the to-be-migrated page information into the reserved memory and transmitting the information to the virtual machine; and making the virtual machine read the page table information in the shared memory so as to acquire the virtual machine physical page frames to be migrated, and using a page migration mechanism at the kernel to perform migration of physical pages of the virtual machine across the NUMA nodes, thereby realizing physical medium shift of the hybrid memory structure. At this point, one of the page migration operation has been done.

According to one preferred embodiment, the method may comprise at least one of the following steps: reserving the making the shared memory in the virtual machine, programming a kernel module for related features, using the get freepages function to acquire physical pages of the virtual machine during module initialization and marking the pages as reserved ones, transmitting information about the reserved memory to the KVM hypervisor 200 through a hypercall system, and using the corresponding struct records.

According to one preferred embodiment, in the present invention, when the virtual machine is activated, the virtual NUMA nodes are bound so as to realize simulation of the virtual machine hybrid memory. After the virtual machine is activated, the reserved memory address space acts as a storage space for the to-be-migrated virtual machine physical page frames. The combination of the both is the supporting technology for live memory page migration.

According to one preferred embodiment, the EPT page tables come from a hardware optimization technology for memory virtualization provided by Intel processors, for enhancing address translation efficiency of virtual machines. EPT table entries include Access/Dirty marker bits, and through Set/Reset operations, page access and cold/hot page information can be recorded and analyzed. A hot page is a page more frequently written and cold page is a page less page. Memory medium shift is performed as much as possible between hot pages in the non-volatile memory and cold pages in the DRAM 300.

According to one preferred embodiment, the virtual machine and hypervisor 200 access the shared memory by performing a mutex-based atomic operation through a hypercall, thereby ensuring consistency and effectiveness of the shared memory data.

According to one preferred embodiment, the method may comprise: making the virtual machine reserve the shared memory, which may comprise at least one of the following sub-steps: during initialization of the virtual machine binding two virtual NUMA nodes of the virtual machine to two physical NUMA nodes of the physical machine, so as to realize simulation of virtual machine hybrid memory; after the virtual machine is activated, inserting the module of the reserved shared memory, applying for a certain number of physical pages from the virtual machine, and marking the pages as the reserved memory; after the memory is reserved, calling the hypercall interface using kernel mode programming so as to transmit the reserved physical memory information to the KVM, which particularly involves using the hypercall interface to transmit the initial address and size of the reserved memory; making KVM store the reserved memory information received from the virtual machine, including the initial address and size, into the corresponding struct for later address translation; and/or making the KVM call the gfn_to_pfn interface to translate the physical address applied for by the virtual machine into a real physical address, so that when the KVM reads and writes the physical address, the virtual machine acquires information while accessing the reserved memory, thereby realizing memory sharing between the virtual machine and the hypervisor 200. Preferably, the gfn_to_pfn interface may refer to an address mapping interface from the virtual machine to the physical machine. The gfn_to_pfn interface is designed for address translation, which particularly involves translating a physical page frame of the virtual machine (i.e. a guest frame number, or gfn) into a physical page frame of the physical machine (i.e. physical frame number). This enables the KVM to acquire the physical address of the physical machine in the shared memory region transmitted by the virtual machine.

According to one preferred embodiment, the method may comprise: making the hypervisor 200 collect statistics of page hotness, which may comprise at least one of the following sub-steps: making the KVM periodically wakening the EPT page table scanning progress 220, traversing page table, recording access frequentness of page tables according to the A/D marker bit, wherein the page table information is recorded as a quaternion in the form of {GFN, PFN, Counter, Time}, including the guest machine physical page frame, the host machine physical page frame, the frequentness and the timestamp; and/or using multi-level hash linked lists to manage cold/hot page information according to the count and timestamp information of EPT table entries, using hash to speed up looking up, and dividing the linked lists into three levels according to access frequentness, including Hot, Active and Cold. The three levels have their respective access frequentness and scanning level descended ordinally, thereby reducing useless page scanning. After a fixed interval, GFNs to migrate from the NVM 400 to the DRAM 300 are selected from the Hot linked lists, and GFNs to migrate from the DRAM 300 to the NVM 400 are selected from the Cold linked lists, so as to determine the number of pages to be migrated between the two memory media. Preferably, the physical page frame of a guest machine may refer to a virtual machine page frame or a physical page frame of the virtual machine. The host physical page frame may refer to a physical machine page frame or a physical page frame of a physical machine. Preferably, the A/D marker bit may refer to an Access/Dirty marker bit. The Access/Dirty marker bits may comprise Access marker bits and/or Dirty marker bits. The Access marker bits may refer to read marker bits. The Dirty marker bit may refer to write marker bits.

According to one preferred embodiment, the method may comprise: making the virtual machine-hypervisor 200 coordinate page migration. The step of making the virtual machine-hypervisor 200 coordination page migration may comprise at least one of the following sub-steps: making the QEMU monitor 510 send a command for page migration to KVM, so as to activate the page migration progress and order the KVM to write the to-be-migrated virtual machine physical page frame information into the reserved memory;

making the virtual machine read information of the reserved memory space so as to acquire physical page frames of the virtual machine to migrate, and using the kernel migration mechanism to perform migration on the NUMA nodes of the physical pages of the virtual machine, thereby achieving physical medium shift of the underlying hybrid memory and accomplishing migration of cold/hot pages; and/or determining whether the page migration flow has ended, and making the QEMU monitor 510 send a modulation command to the hypervisor 200, if yes, exiting the page migration process and hanging up the EPT page table scanning progress 220; if not, proceeding with the page migration process.

A word "module" as described in the description refers to a hardware, a software or any combination of a hardware and a software which can execute the function related to "module".

It should be noted that the above specific embodiments are exemplary, persons skilled in the art can devise various solutions under the inspiration of the disclosed content of the present invention, and the solutions also belong to the disclosed scope of the present invention and fall into the protection scope of the present invention. Persons skilled in the art shall understand that the specification and its drawings of the present invention are exemplary and do not limit the claims. The protection scope of the present invention is limited by the claims and its equivalents.

What is claimed is:

1. A hybrid memory system with live page migration for virtual machine, wherein the system comprising a physical machine installed with a virtual machine and being configured to:
    build a channel for a shared memory between the virtual machine and a hypervisor;
    make the hypervisor generate to-be-migrated cold/hot page information and write the to-be-migrated cold/hot page information into the shared memory, including:
        making the hypervisor periodically acquire write frequentness and a timestamp of a page table;
        making the hypervisor use multi-level hash linked lists to manage the general cold/hot page information and updating the general cold/hot page information according to the write frequentness and the timestamp of the page table;
        making the hypervisor extract from the general cold/hot page information the pages to be migrated so as to generate the to-be-migrated cold/hot page information; and
        making the hypervisor write the to-be-migrated cold/hot page information into the shared memory;
    make the virtual machine read the to-be-migrated cold/hot page information from the shared memory; and
    make the virtual machine according to the read to-be-migrated cold/hot page information perform a page migration process across heterogeneous memories of the virtual machine without stopping the virtual machine,
    wherein the heterogeneous memories comprise a dynamic random access memory (DRAM) and a non-volatile memory (NVM), in which the virtual machine according to the read to-be-migrated cold/hot page information performs the page migration process between the heterogeneous memories in a live manner, so as to have hot pages that have relatively high writing hotness migrating from the NVM to the DRAM, and to have cold pages that have relatively low writing hotness migrating from the DRAM to the NVM; and
    wherein the hypervisor is a kernel-based virtualization module (KVM).

2. The system of claim 1, wherein making the hypervisor use the multi-level hash linked lists to manage the general cold/hot page information and updating the general cold/hot page information according to the write frequentness and the timestamp of the page table further comprises:
    dividing the multi-level hash linked lists into at least three levels according to the write frequentness, in which a said linked list at a relatively low said level has relatively low write frequentness and scanning level.

3. The system of claim 2, wherein the to-be-migrated cold/hot page information generated by the hypervisor through extracting the pages to be migrated from the general cold/hot page information is generated by selecting from the linked list having the highest level virtual machine page frames to migrate from the NVM to the DRAM and selecting from the linked list having the lowest level the virtual machine page frames to migrate from the DRAM to the NVM.

4. The system of claim 3, wherein making the virtual machine according to the read to-be-migrated cold/hot page information perform the page migration process between the heterogeneous memories in the live manner further comprises:
    sending a page migration commend through a user-level simulation platform to the hypervisor so as to order the hypervisor to write the to-be-migrated cold/hot page information into the reserved shared memory;
    making the virtual machine read the to-be-migrated cold/hot page information so as to acquire the virtual machine page frames to be migrated; and
    making the virtual machine use a kernel migration mechanism to perform NUMA node migration for the virtual machine page frames, so as to accomplish migration of cold/hot pages through shifting between physical media of the underlying heterogeneous memories.

5. The system of claim 4, wherein when the virtual machine and/or the hypervisor access the shared memory, a mutex-based atomic operation is performed through a hypercall, so as to realize consistency and effectiveness of data in the shared memory.

6. A non-stop page migration method for a hybrid memory system for virtual machine, wherein the method comprises:
    building a channel for a shared memory between the virtual machine and a hypervisor;
    making the hypervisor generate to-be-migrated cold/hot page information and writing the to-be-migrated cold/hot page information into the shared memory, including
        making the hypervisor periodically acquire write frequentness and a timestamp of a page table;
        making the hypervisor use multi-level hash linked lists to manage the general cold/hot page information and updating the general cold/hot page information according to the write frequentness and the timestamp of the page table;
        making the hypervisor extract from the general cold/hot page information the pages to be migrated so as to generate the to-be-migrated cold/hot page information; and
        making the hypervisor write the to-be-migrated cold/hot page information into the shared memory;
    making the virtual machine read the to-be-migrated cold/hot page information from the shared memory; and
    making the virtual machine according to the read to-be-migrated cold/hot page information perform a page migration process across heterogeneous memories of the virtual machine without stopping the virtual machine;

wherein the heterogeneous memories comprise a dynamic random access memory (DRAM) and a non-volatile memory (NVM), in which the virtual machine according to the read to-be-migrated cold/hot page information performs the page migration process between the heterogeneous memories in a live manner, so as to have hot pages that have relatively high writing hotness migrating from the NVM to the DRAM, and to have cold pages that have relatively low writing hotness migrating from the DRAM to the NVM; and wherein the hypervisor is a kernel-based virtualization module (KVM).

* * * * *